United States Patent
Watanabe et al.

(10) Patent No.: US 7,573,801 B2
(45) Date of Patent: Aug. 11, 2009

(54) OPTICAL PICKUP

(75) Inventors: Yukio Watanabe, Uji (JP); Tetsuo Ueyama, Nara (JP); Osamu Miyazaki, Kyoto (JP); Kazunori Matsubara, Nara (JP); Shinzoh Murakami, Nara (JP); Kazuhiro Tsuchida, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 523 days.

(21) Appl. No.: 11/511,743

(22) Filed: Aug. 28, 2006

(65) Prior Publication Data

US 2007/0053272 A1 Mar. 8, 2007

(30) Foreign Application Priority Data

Aug. 26, 2005 (JP) ............................ P2005-246686

(51) Int. Cl.
*G11B 7/00* (2006.01)
(52) U.S. Cl. ............................ 369/112.23; 369/112.14; 369/112.28; 369/44.23
(58) Field of Classification Search ........................ None
See application file for complete search history.

(56) References Cited

U.S. PATENT DOCUMENTS

| 5,293,367 | A |   | 3/1994 | Kadowaki et al. |
| 5,636,190 | A | * | 6/1997 | Choi ........................ 369/44.23 |
| 2004/0027939 | A1 |   | 2/2004 | Okada |
| 2004/0184383 | A1 |   | 9/2004 | Nakayama et al. |
| 2005/0161579 | A1 |   | 7/2005 | Kim et al. |
| 2006/0262695 | A1 | * | 11/2006 | Tsuchida et al. ............... 369/94 |

FOREIGN PATENT DOCUMENTS

| EP | 1 615 208 A1 | 1/2006 |
| JP | 04-040634 | 2/1992 |
| JP | 2004-127482 | 4/2004 |
| JP | 2004-288227 | 10/2004 |
| JP | 2005-063595 | 3/2005 |
| JP | 2006-114151 | 4/2006 |
| JP | 2006-196051 | 7/2006 |

* cited by examiner

*Primary Examiner*—Muhammad N. Edun
(74) *Attorney, Agent, or Firm*—David G. Conlin; Steven M. Jensen; Edwards Angell Palmer & Dodge LLP

(57) ABSTRACT

An optical pickup includes a hologram element. The hologram element is provided with a hologram pattern including a splitting section for focus which splits light used for the detection of an FES and a splitting section for tracking which splits light used for the detection of a TES. The splitting section for tracking is formed in a region excluding a region interposed between a first virtual straight line and a second virtual straight line. The first virtual straight line is drawn on the hologram element in parallel to an X direction and passes through an optical axis of reflected light entering the hologram element in a state where the objective lens is in a neutral position, and the second virtual straight line is drawn in parallel to the first virtual straight line, while being spaced at a distance d from the first virtual straight line.

5 Claims, 12 Drawing Sheets

OPTICAL PICKUP

BACKGROUND OF THE INVENTION

1. Field of the Invention

The present invention relates to an optical pickup capable of recording/reproducing information by irradiating a recording medium with light.

2. Description of the Related Art

Recording mediums used in an information recording/reproducing device tend to employ an optical recording system, not a magnetic recording system. The optical recording system has a larger recording capacity and is excellent in convenience of control when recording/reproducing is performed. As a recording medium used for the optical recording system, there are provided a compact disk (abbreviated to CD), a digital versatile disk (abbreviated to DVD) and the like. DVD uses light, having a wavelength shorter than light used in recording/reproducing CD, in recording/reproducing so as to increase a recording capacity.

An optical pickup is used in recording/reproducing information onto and from a recording medium such as a CD or DVD. FIG. 6 is a diagram simply showing the configuration of an optical pickup 1 according to the related art, and FIG. 7 is a view schematically showing the configuration of a hologram element 4 provided in the optical pickup 1. The optical pickup 1 includes a light source 2 emitting light, a grating 3, a hologram element 4, a collimator lens 5, an objective lens 6, and a light receiving unit 7 serving as provided with light receiving elements. The optical pickup 1 records/reproduce information onto and from a disk 8 serving as a recording medium.

A semiconductor laser for emitting a laser beam, or the like is used as for the light source 2. The grating 3 splits light emitted from the light source 2 into three beams including a main beam 11 and first and second sub-beams 12 and 13. The grating 3 has such a structure in which periodical irregularities are formed thereon and diffracts the emitted light so as to generate a plurality of beams. When the irregularities formed on the grating 3 have a simple and periodic rectangular shape, diffracted light components to be generated are zero-order diffracted light (the main beam 11), +first-order diffracted light (the first sub-beam 12), and −first-order diffracted light (the second sub-beam 13). The main beam 11 is a main light flux for obtaining information recorded on the recording medium 8, and the sub-beams 12 and 13 are used in controlling a focused position of the main beam 11. Light split by the grating 3 passes through the hologram element 4. Then, the light passes through the collimator lens 5 so as to become substantially parallel light and is introduced to the objective lens 6.

The objective lens 6 focuses the light emitted from the light source 11 into a recording layer for recording information of the disk 8. The objective lens 6 is provided to be displaced in a direction perpendicular to an optical axis 14 of emitted light, which is introduced to the objective lens 6, within a movable range including a neutral position where the optical axis of the objective lens 6 and the optical axis 14 of the emitted light form the light source 2 are on the same axis. The objective lens 6 is displaced in the direction perpendicular to the optical axis 14 of the emitted light, thereby changing a focused position of the emitted light with respect to the disk 8.

The main beam 11 and the first and second sub-beams 12 and 13 are focused on the disk 8 by the objective lens 6. After passing through the objective lens 6, the main beam 11 and the first and second sub-beams 12 and 13 reflected by the disk 8 pass through the collimator lens 5 so as to be introduced to the hologram element 4.

The hologram element 4, which is provided between the light receiving unit 7 and the objective lens 6, is a light splitting unit having a hologram pattern which includes a plurality of splitting sections for splitting the reflected light from the disk 8 into a plurality of light components.

The hologram pattern of the hologram element 4 includes a splitting section 15 for tracking and a splitting section 16 for focus. The splitting section 15 for tracking splits light used for obtaining track position information which is information on a focused position of emitted light with respect to the disk 8 in the direction perpendicular to the optical axis 14 of the emitted light. The splitting section 16 for focus splits light for obtaining focus position information which is information on a focused position of emitted light in the direction perpendicular to the recording layer of the disk 8.

The hologram pattern is divided into the splitting section 15 for tracking and the splitting section 16 for focus, which are commonly formed in a semi-circular shape, by a first dividing line 17. The first dividing line 17 is parallel to a radial direction (an X direction of FIGS. 6 and 7) of the disk 8 which is mounted on an information recording/reproducing device and is recording or reproducing information. The splitting section 15 for tracking is further divided into two parts by a second dividing line 18 parallel to a tangential direction (a Y direction of FIGS. 6 and 7) with respect to tracks formed on the disk 8, so that two splitting sections for tracking 19 and 20 are formed. Hereinafter, the splitting section 16 for focus is abbreviated to a first region 16, the splitting section 19 for tracking is abbreviated to a second region 19, and the splitting section 20 for tracking is abbreviated to a third region 20.

Here, the X direction as the radial direction and the Y direction as the tangential direction are commonly used in the entire specification. Note that the radial direction of the disk, that is, the recording medium 8 represents a direction along one radial line connecting a point at an intersection between an optical axis of light emitted by the optical pickup apparatus 1 and a recording surface of the recording medium 8, with a center of the recording medium 8. Further, the radial direction is perpendicular to the tangential direction in the recording surface of the recording medium 8.

Depending on a position of the objective lens 6, a position of emitted light spot 21 entering the hologram element 4 changes. For example, when the objective lens 6 is in the neutral position, the main beam 11 reflected from the disk 8 enters the hologram element 4 such that the optical axis of the main beam 11 passes through the center of the hologram pattern. At this time, the main beam 11 and the first and second sub-beams 12 and 13 enter the second region 19 and the third region 20 such that the same proportion of light is delivered to each region. Meanwhile, when the objective lens 6 is in a position deviated from the neutral position in the radial (X) direction, the optical axis of the main beam 11 reflected from the disk 8 is displaced along the first dividing line 17 extending in the X direction. At this time, the main beam 11 reflected by the disk 8 enters the hologram element in such a biased state so that a larger amount of light is delivered to the second region 19 or the third region 20 of the hologram pattern.

FIG. 8 is a top view showing the simplified configuration of the light receiving unit 7. The light receiving unit 7 is a light detecting unit provided with a plurality (eight in the present embodiment) of light receiving elements formed of, for example, photodiodes. The respective light receiving elements are formed in a substantially rectangular shape and are arranged in the Y direction such that the longitudinal directions thereof are positioned in the X direction. The light receiving unit 7 includes a first light receiving section 7A composed of first and second light receiving elements 7a, 7b, a second light receiving section 7B composed of third to fifth light receiving elements 7d, 7g, and 7h, and a third light receiving section 7C composed of sixth to eighth light receiving elements 7c, 7e, and 7f.

The light, which is reflected by the disk 8 and then enters the first region 16 of the hologram element 4, is diffracted to be introduced into the first light receiving section 7A (the first and second light receiving elements 7a and 7b) for detecting a focus error signal (abbreviated to FES) On the basis of the result of light received by the first light receiving section 7A, an FES is generated.

Among the light beams, which are reflected by the disk 8 and then enter the second region 19 of the hologram element 14, the main beam 11 is introduced to the third light receiving element 7d of the second light receiving section 7B, and the first and second sub-beams 12 and 13 are respectively introduced to the fifth and fourth light receiving elements 7h and 7g of the second light receiving section 7B. Among the light beams, which are reflected by the disk 8 and then enter the third region 20 of the hologram element 4, the main beam 11 is introduced to the sixth light receiving element 7c of the third light receiving section 7C, and the first and second sub-beams 12 and 13 are respectively introduced to the eighth and seventh elements 7f and 7e of the third light receiving section 7C.

On the basis of signals detected by the respective light receiving elements corresponding to the second region 19 and signals detected by the respective light receiving elements corresponding to the third region 20, a tracking error signal (abbreviated to TES), which indicates the displacement in a direction perpendicular to the optical axis of emitted light of the objective lens 6, is detected. Accordingly, a positional deviation of the objective lens 6 from the neutral position in the radial (X) direction is detected by the TES signal.

As for the disk 8 serving as a recording medium, there is provided a CD or DVD as described above. As a disk material of DVD, the same polycarbonate as that of CD is used. However, CD is formed of single plate with a thickness of 1.2 mm, and DVD has such a structure that two disks with a thickness of 0.6 mm are bonded to each other. In DVD having such a structure, light with a short wavelength is used to increase a recording capacity. Further, recording can be performed on two layers, that is, both surfaces, which makes it possible to implement a further increase in recording capacity.

In the case of a disk having a two-layer structure, however, the following problem occurs. FIG. 9 is a view for schematically illustrating reflected light in the case of the disk having two recording layers. The disk 8 of FIG. 9 has a first recording layer 8a as an upper layer and a second recording layer 8b as a lower layer. In the optical pickup 1, when the light from the light source 2 is focused on the first recording layer 8a, most of the light is reflected by the first recording layer 8a so as to become reflected light 22. However, a part of the light transmits through the first recording layer 8a into the second recording layer 8b and is then reflected in the second recording layer 8b.

As compared with the first recording layer 8a, the second recording layer 8b is in a position more separated from the objective lens 6. Accordingly, the reflected light 22 from the second recording layer 8b is reflected in a position 24 separated in comparison with a focal position of the objective lens 6. In a state where the beam radius of reflected light becomes small by the objective lens 6 and the collimator lens 5, the reflected light 22 enters the hologram element 4. Further, when the reflected light entering the hologram element 4 is diffracted by the hologram element 4, the size of the light spot becomes large on the light receiving unit 7. Therefore, the reflected light can enter light receiving elements other than predetermined light receiving elements.

When the objective lens 6 is in the neutral position, an output signal indicated by a TES on the basis of the reflected light 22 from the first recording layer 8a becomes 0. However, an output value indicated by a TES on the basis of the reflected light 23 from the second recording layer 8b does not become 0, because the first sub-beam 12 enters the fourth light receiving element 7g of the second light receiving section 7B. That is, an output value by the light receiving elements receiving the respective sub-beams does not become 0.

FIG. 10 is a view showing a state where reflected light enters the hologram element 4 when the objective lens 6 is in a position deviated from the neutral position. When the objective lens 6 is deviated from the neutral position, the reflected light 23 from the second recording layer 8b enters any one of the second and third regions 19 and 20 of the hologram pattern, as shown in FIG. 10. In the present embodiment, the reflected light 23 enters only the second region 19.

When the reflected light 23 from the second recording layer 8b enters only the second region 19, the reflected light 23 enters only the second light receiving section 7B corresponding to the second region 19, but does not enter the third region 7C corresponding to the third region 20. When the reflected light 23 from the second recording layer 8b enters only the second region 19 so as to enter only the second light receiving section 7B corresponding to the second region 19, an output value by the light receiving element of the second light receiving section 7B becomes constant even though the objective lens 6 is displaced. Therefore, an offset is generated in an output value indicated by a TES.

In the disk having two recording layers as described above, when the hologram element 4 shown in FIG. 7 is used and information of one recording layer is obtained, the reflected light from the other recording layer exerts an effect. Therefore, it is impossible to accurately calculate a displaced position of the objective lens 6 with respect to the neutral position in the radial (X) direction.

An apparatus in which the shape of a hologram pattern formed in a hologram element is corrected has been proposed in order to solve the problem (refer to Japanese Unexamined Patent Publication JP-A 2004-303296). FIG. 11 is a top view showing the configuration of a hologram element 30 proposed in an optical pickup in the related art. The hologram element 30 includes first to third regions 31 to 33. The first region 31 forms a splitting section for focus, and the second and third regions 32 and 33 forms a splitting section for tracking. Although the hologram element 30 is similar to the hologram element 4 shown in FIG. 7, the hologram element 30 has a different feature in that the disposition of the respective regions and the shapes thereof are different from those of the hologram element 4.

The second and third regions 32 and 33 serving as the splitting section for tracking are formed so as to be disposed in a region excluding an axis neighboring portion 36 of the hologram element 30 which coincides with an optical axis 35 of reflected light 34 introduced to the hologram element 30 when the objective lens 6 is in the neutral position. The axis neighboring portion 36 is formed in a semi-circular shape centered on the optical axis 35.

In other words, the hologram pattern of the hologram element 30, which is formed in a substantially circular shape, is divided into the first region 31 serving as the splitting section for focus and the remaining splitting section for tracking by a first dividing line 37 which is parallel to the radial (X) direction and has a semi-circular curved line portion formed in the center thereof. The remaining splitting section for tracking is divided into the second and third regions 32 and 33 by a second dividing line 38 parallel to the tangential direction. The first region 31 is formed to have the semi-circular axis neighboring portion 36 protruding toward the second and third regions 32 and 33 more than a virtual dividing line 39 connecting both ends of the first dividing line 37 in the semi-circular curved portion 37a of the first dividing line 37. Therefore, the second and third regions 32 and 33 are formed in a circular-ring-shaped one-quarter circle.

As the hologram 30 having such a hologram pattern is used, the reflected light from the other recording layer, of which the beam size is small, enters the axis neighboring portion 36 and can be prevented from entering the second and third regions 32 and 33 for generating a TES. Therefore, it is possible to obtain accurate tracking position information and position deviation information.

However, the hologram pattern proposed in JP-A 2004-303296 has the following problem. When information is recorded and reproduced onto and from the first recording layer of the disk having two recording layers, a part of light transmits through the first recording layer into the second recording layer and is reflected therein. At this time, light diffracted by a land/group, which is formed in the second recording layer, as well as the reflected light is generated.

FIG. 12 is a view showing a state where the diffracted light diffracted by the second recording layer enters the hologram element 30. The diffracted light diffracted by the second recording layer forms a first spot 41, a second spot 42 and a third spot 43. The first spot 41 falls on the first dividing line 37 across the first and second regions 31 and 32 on the hologram pattern. The second spot 42 falls on the first dividing line 37 across the first and second regions 31 and 33 on the hologram pattern. The third spot 43 is zero-order diffracted light which falls on the axis neighboring portion 36. The first and second spots 41 and 42 respectively enter the second and third regions 32 and 33 serving as the splitting section for tracking which splits light for TES generation. Therefore, the light entering the second and third regions 32 and 33 are respectively diffracted so as to be introduced into the second and third light receiving sections 7B and 7C for TES detection.

FIG. 13 is a diagram showing a state where the diffracted light by the second recording layer enters the light receiving unit 7. The diffracted light spots 41 and 42, which are diffracted by the second recording layer so as to enter the hologram element 30, respectively form greatly-extended spots 41a and 42a on the second and third light receiving sections 7B and 7C. Further, the diffracted light spots 41 and 42 also enter the fourth and fifth light receiving elements 7g and 7h and the seventh and eighth light receiving elements 7e and 7f serving as light receiving elements for sub-beams for obtaining position signals.

The light intensity of the sub-beam is about one tenth of that of the main beam. Therefore, the amplification degree with respect to detection output by the light receiving element receiving the sub-beam is set to be larger than the amplification degree with respect to detection output by the light receiving element receiving the main beam. Therefore, the diffracted light (stray light) by the second recording layer has a large effect on the sub-beam of the original reflected light from the first recording layer. Further, noise components and offset components, which are not necessary for lens position signal and TES, are generated by the stray light, thereby degrading tracking servo characteristics.

In other words, the hologram pattern of the hologram element 30 proposed in the JP-A 2004-303296 can exclude an effect of the simple reflected light (zero-order diffracted light) by the second recording layer. However, the hologram pattern cannot exclude an effect of the diffracted light by the land/group of the second recording layer.

SUMMARY OF THE INVENTION

The invention is made in view of the above problem, and an object thereof is to provide an optical pickup which, when recording/reproducing of information is performed on one recording layer, can reduce an effect of stray light caused by the diffraction of the other recording layer, thereby obtaining a stabilized tracking servo signal.

The invention provides an optical pickup which records information on a recording medium and/or reproduces information from a recording medium by irradiating the recording medium with light which recording medium has a plurality of recording layers for recording information, the optical pickup comprising:

a light source for emitting light;

an objective lens for focusing the light emitted from the light source on one recording layer of the recording medium, the objective lens being disposed so as to be displaceable in a direction perpendicular to an optical axis of the emitted light within a movable range including a neutral position where the optical axis of the objective lens and the optical axis of the emitted light from the light source are on the same axis, and to change a focused position of the emitted light with respect to the recording medium by displacement in the direction perpendicular to the optical axis of the emitted light;

a light receiving unit having a plurality of light receiving elements for receiving light reflected by the recording medium; and a light splitting unit that is provided between the light receiving unit and the objective lens and has a plurality of splitting sections for splitting the reflected light from the recording medium into a plurality of light components, the light splitting unit having a splitting section for tracking which splits light used for obtaining track position information as information on a focused position of emitted light with respect to the recording medium in a direction perpendicular to the optical axis of the emitted light, wherein the splitting section for tracking is formed in a region excluding a region interposed between a first virtual straight line and a second virtual straight line, in which the first virtual straight line is drawn on the light splitting unit in parallel to a radial direction passing through one radial line of the recording medium, and passes through the optical axis of reflected light entering the light splitting unit in a state where the objective lens is in the neutral position, and the second virtual straight line is drawn on the light splitting unit in parallel to the first virtual straight line, while being spaced at a predetermined distance from the first virtual straight line.

According to the invention, the optical pickup includes the light splitting unit having the plurality of splitting sections for splitting the reflected light from the recording medium into a plurality of light components, and the light splitting unit is formed between a light receiving section and an objective lens. The light splitting unit includes the splitting section for tracking that splits light used for obtaining track position information as information on a focused position of emitted light with respect to the recording medium in the direction perpendicular to the optical axis of the emitted light. The splitting section for tracking is formed in a region excluding a region interposed between a first virtual straight line and a second virtual straight line. The first virtual straight line is drawn on the light splitting unit in parallel to the radial direction of the recording medium and passes through the optical axis of reflected light entering the light splitting unit in a state where the objective lens is in the neutral position. The second virtual straight line is drawn on the light splitting unit in parallel to the first virtual straight line, while being spaced at a predetermined distance from the first virtual straight line. Accordingly, when recording/reproducing of the recording medium having two recording layers is performed on the first recording layer, among the diffracted light (stray light) components by the second recording layer, stray light components entering the splitting section for tracking can be reduced, which makes it possible to perform stabilized tracking servo. Therefore, in the optical pickup having such light splitting unit mounted, favorable tracking servo and focus servo are realized.

Further, in the invention, it is preferable that when a size of a reflected light spot which is reflected by a recording layer other than one recording layer and enters the light splitting unit is smaller than that of a reflected light spot which is reflected by the one recording layer and enters the light splitting unit, the region interposed between the first virtual straight line and the second virtual straight line is formed to include a diffracted light spot generated by the recording layer other than the one recording layer.

According to the invention, for example, when the size of the reflected light spot which is reflected by the second recording layer and enters the light splitting unit is smaller than that of the reflected light spot which is reflected by the first recording layer and enters the light splitting unit, the region interposed between a first virtual straight line and a second virtual straight line is formed to include a diffracted light (stray light) spot generated by the second recording layer. Since it is possible to exclude an effect of the reflected light (stray light) by the second recording layer, it is possible to obtain a stabilized tracking servo signal, thereby improving tracking servo characteristics.

Further, in the invention, it is preferable that when a size of a reflected light spot which is reflected by a recording layer other than one recording layer and enters the light splitting unit is smaller than that of a reflected light spot which is reflected by the one recording layer and enters the light splitting unit, the splitting section for tracking is formed in a region excluding a region interposed between the first virtual straight line and the second virtual straight line and a moving region in which the reflected light spot which is reflected by the recording layer other than the one recording layer and enters the light splitting unit, moves with the displacement of the objective lens.

According to the invention, when the size of the reflected light spot which is reflected by the second recording layer and enters the light splitting unit is smaller than that of the reflected light spot which is reflected by the first recording layer and enters the light splitting unit, the splitting section for tracking is formed in the region excluding a region interposed between the first virtual straight line and the second virtual straight line and the moving region in which the reflected light spot which is reflected by the second recording layer and enters the light splitting unit, moves with the displacement of the objective lens. Then, since it is possible to completely exclude an effect of diffracted light (stray light) by the second recording layer and simple reflected light, it is possible to improve tracking servo characteristics.

Further, in the invention, it is preferable that the splitting section for tracking is formed on both sides of the first virtual straight line.

According to the invention, the splitting section for tracking is formed on both sides of the first virtual straight line. Therefore, it is possible to increase the light intensity (light volume) of sub-beam received by the light receiving unit, which makes it possible to improve tracking servo signal characteristics.

Further, in the invention, it is preferable that the light splitting unit has different diffraction efficiency depending on a polarization direction of incident light.

According to the invention, the light splitting unit is constructed so that diffraction efficiency differs depending on a polarization direction of incident light. Therefore, the emitted light from the light source is transmitted almost 100%, and the polarization direction of the reflected light by the recording medium is changed by a polarization plate or the like. Then, only the reflected light can be diffracted, which makes it possible to improve utilization efficiency of light.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
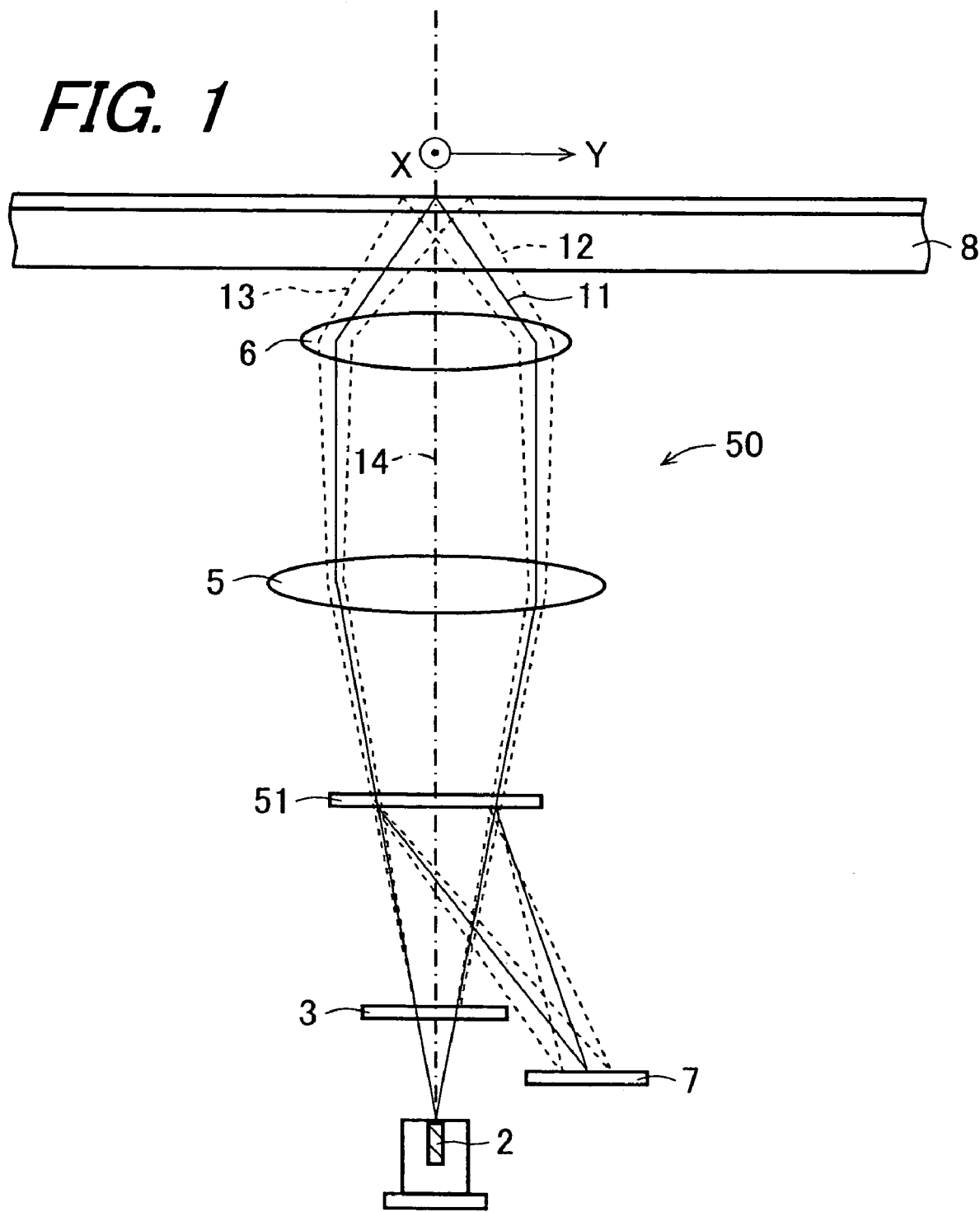
FIG. 1 is a diagram showing the simplified configuration of an optical pickup according to a first embodiment of the invention.

Now referring to the drawings, preferred embodiments of the invention are described below.

Figure 2:
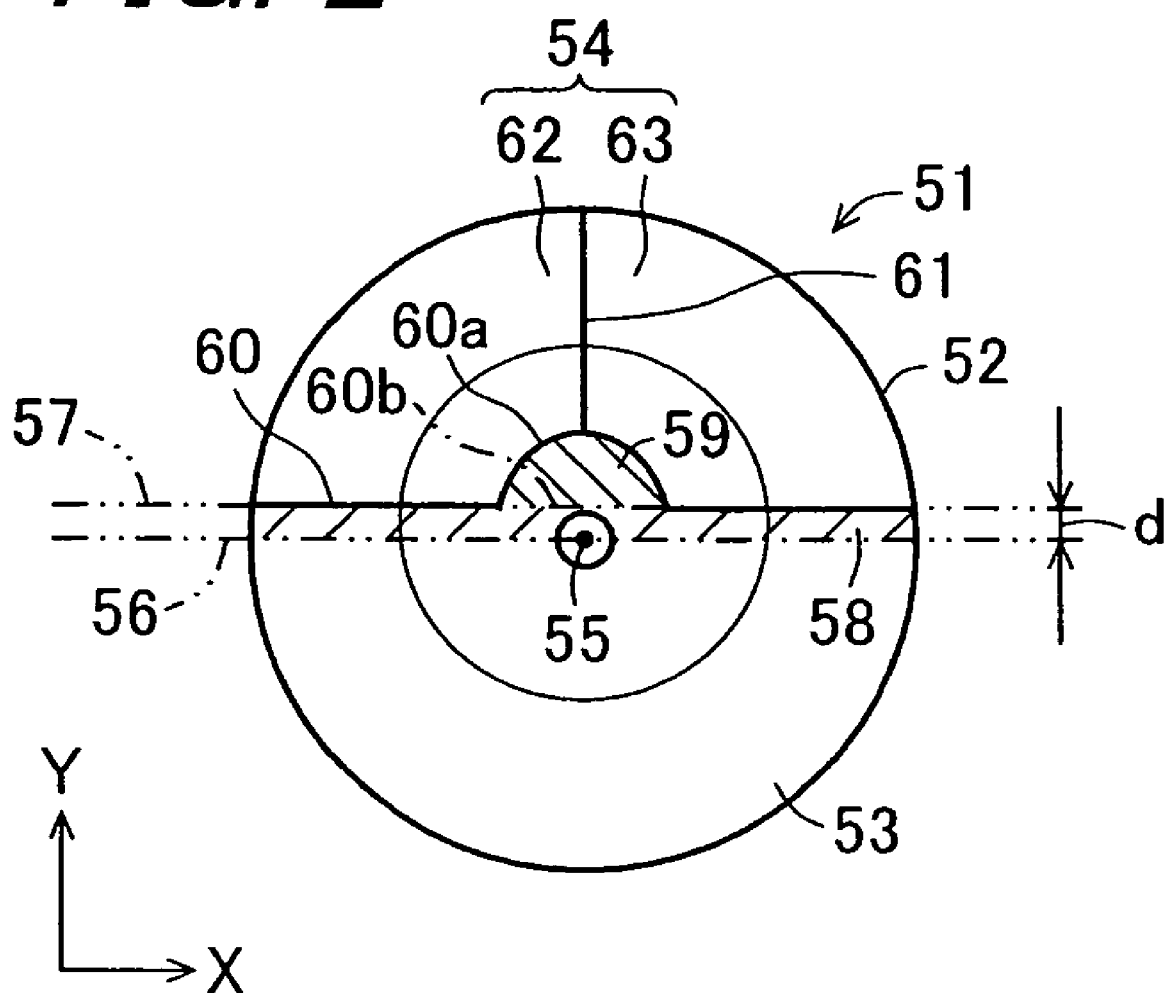
FIG. 2 is a top view showing the configuration of a hologram element provided in the optical pickup shown in FIG. 1.
Figure 6:
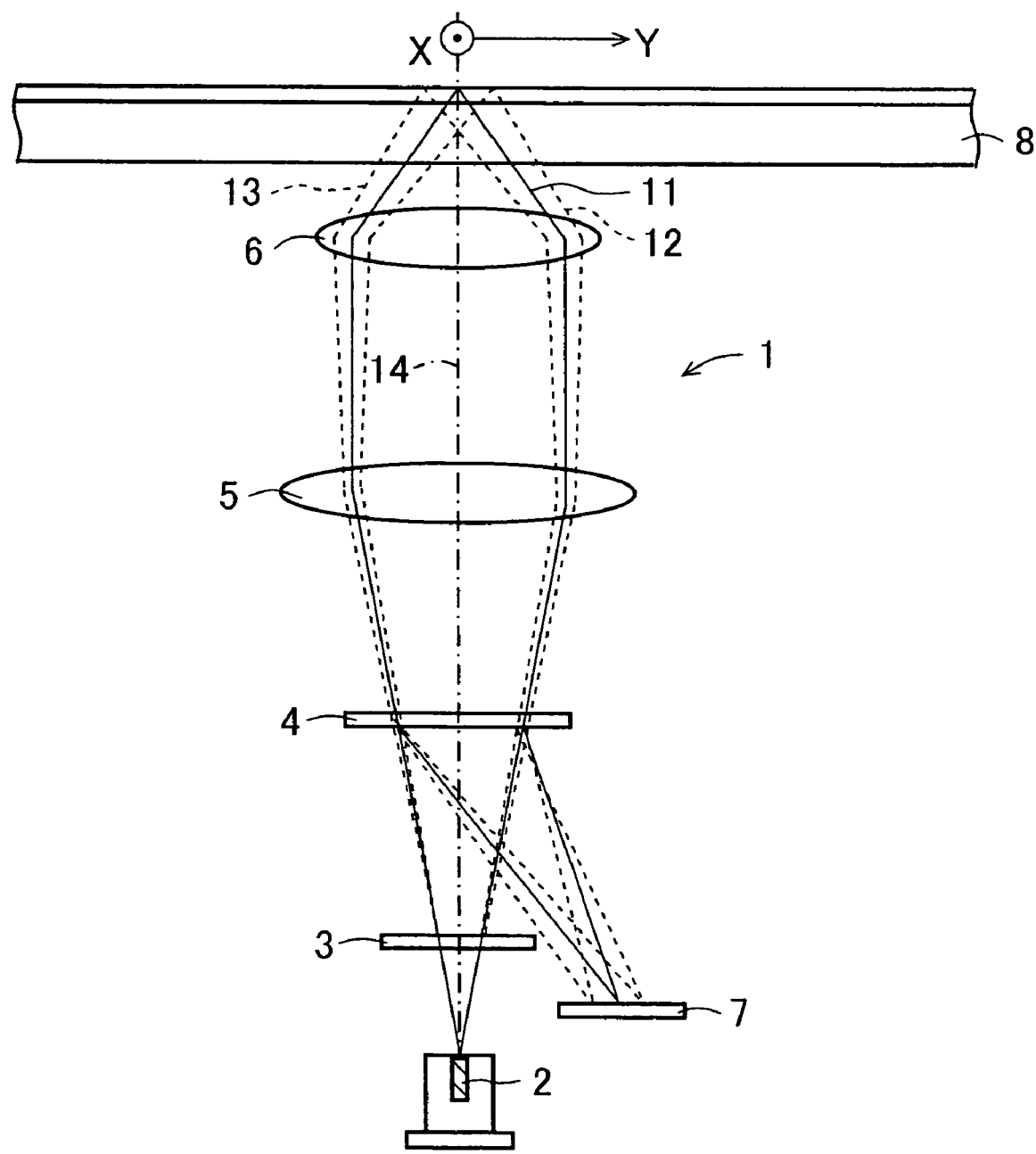
FIG. 6 is a diagram showing the simplified configuration of an optical pickup according to the related art.
Figure 7:
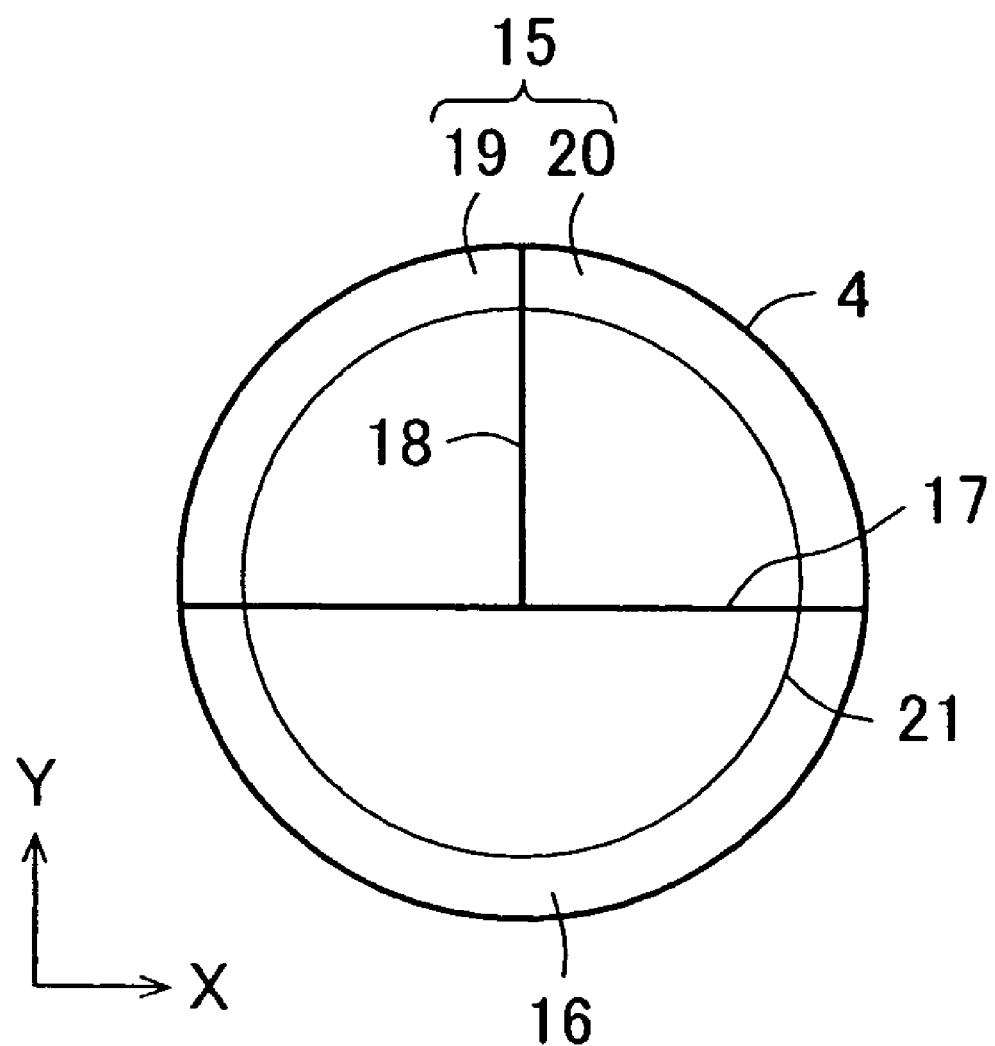
FIG. 7 is a diagram showing the simplified configuration of a hologram element provided in the optical pickup.
Figure 8:
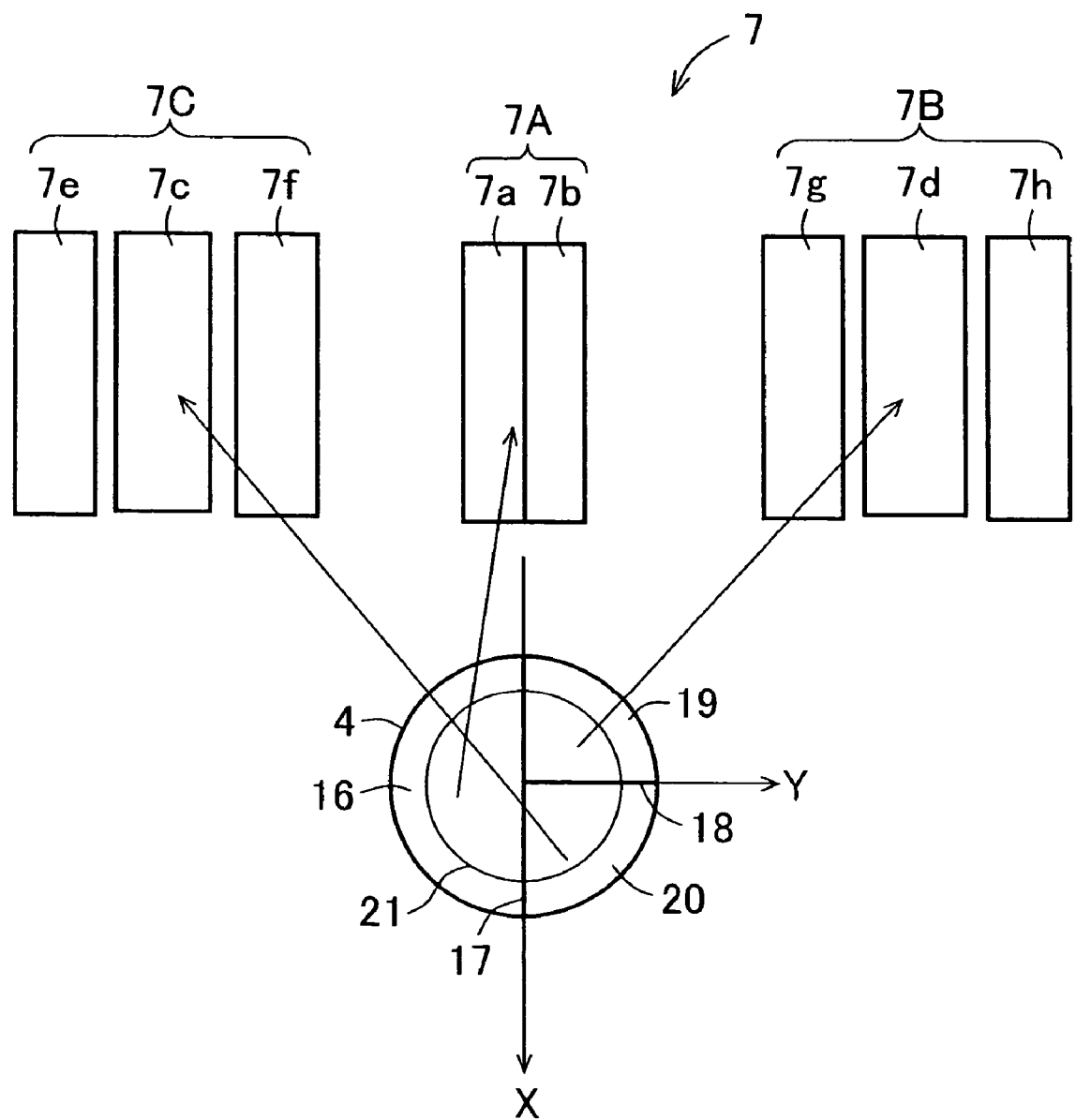
FIG. 8 is a top view showing the simplified configuration of a light receiving unit.

FIG. 1 is a view showing a simplified configuration of an optical pickup 50 according to a first embodiment of the invention, and FIG. 2 is a top view showing the configuration of a hologram element 51 provided in the optical pickup 50 shown in FIG. 1. In the optical pickup 50 according to the present embodiment, components thereof are similar to those of the optical pickup 1 shown in FIG. 6, except for the light splitting unit 51 as a feature thereof.

Therefore, the similar components will be denoted by the same reference numerals, and the descriptions thereof will be omitted.

Figure 9:
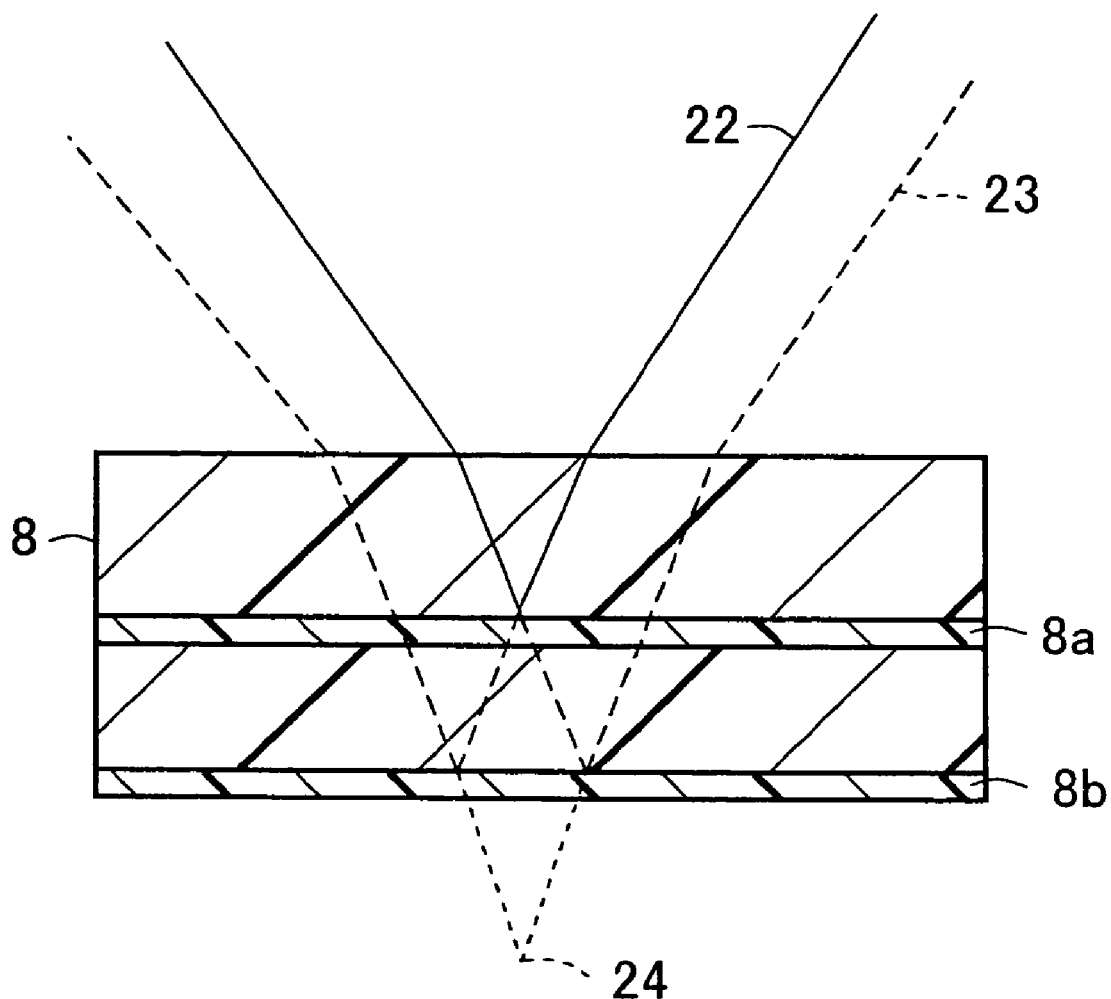
FIG. 9 is a diagram for schematically explaining light reflection in the case of a disk having two recording layers.
Figure 10:
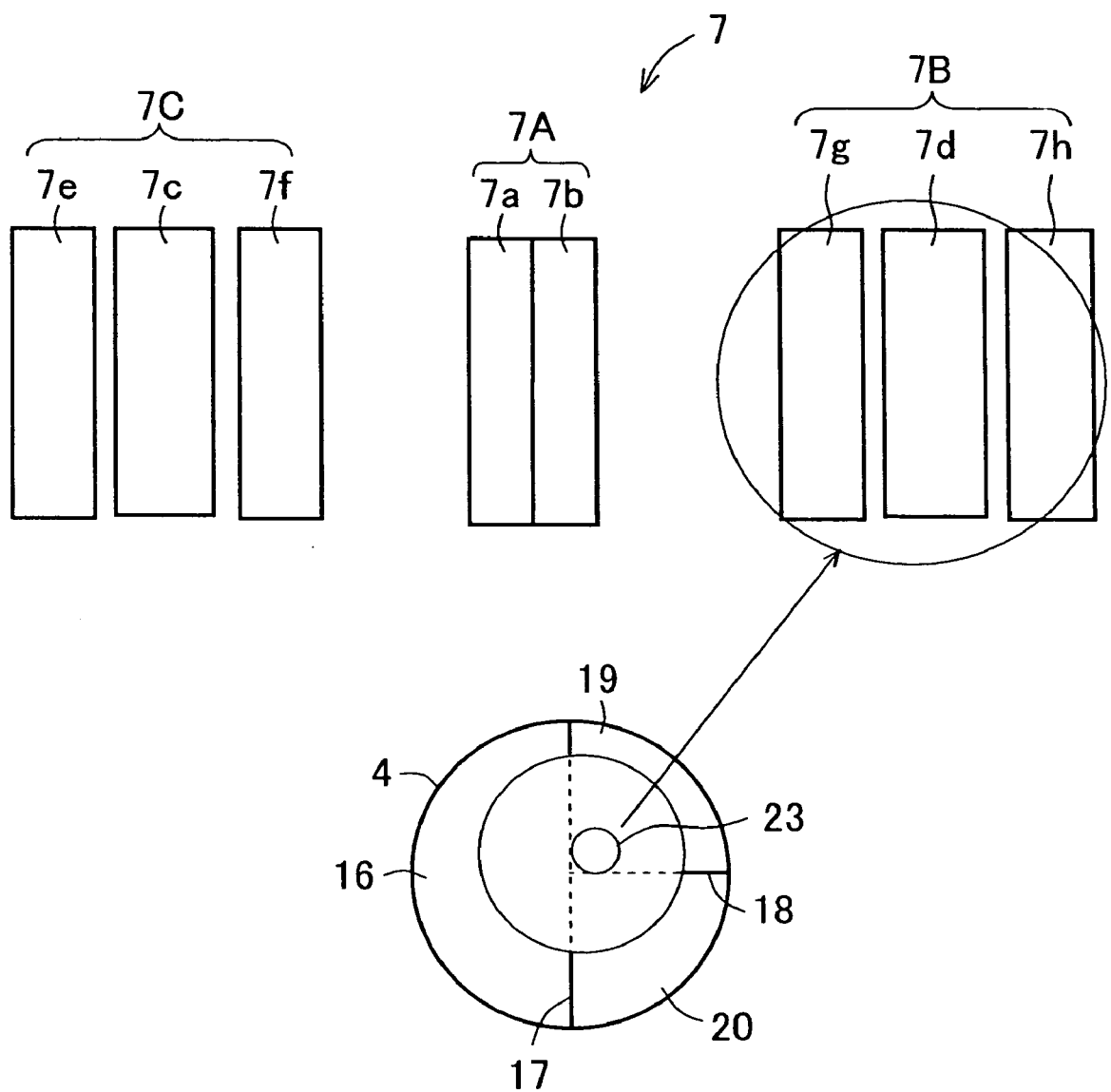
FIG. 10 is a diagram showing a state where reflected light enters the hologram element when an objective lens is in a position deviated from a neutral position.

In the present embodiment, a disk 8 serving as a recording medium is a DVD having two-layer recording structure in which two disks with a thickness of 0.6 mm are superimposed. Of two recording layers, a recording layer close to an objective lens 6 as shown in FIG. 9 is referred to as a first recording layer 8a, and a recording layer distant from the objective lens 6 is referred to as a second recording layer 8b.

The objective lens 6 is mounted on an actuator (not shown) and is driven by the actuator so as to be displaced in a radial (X) direction and a focus direction. Further, the focus direction is a direction parallel to an optical axis 14 of emitted light and is a direction perpendicular to the first and second recording layers 8a and 8b of the disk 8.

The light splitting unit 51, which is a feature of the optical pickup 50 of the present embodiment, is the hologram element 51. The hologram element 51 has a hologram pattern 52 including a splitting section for tracking 54 and a splitting section for focus 53. The splitting section for tracking 54 splits light used for obtaining track position in formation which is information on a focused position of emitted light with respect to the disk 8 in a direction perpendicular to the optical axis 14 of the emitted light. The splitting section for focus 53 splits light used for obtaining focus position information which is information on a focused position of emitted light in a direction perpendicular to the recording layer of the disk 8.

The splitting section for tracking 54 of the hologram pattern 52 is formed in a region excluding a region 58 (hereinafter, referred to as an interline region 58) interposed between a first virtual straight line 56. The first virtual straight line 56 is drawn on the hologram element 51 in parallel to a radial (X) direction of the recording medium 8, and passes through an optical axis 55 of reflected light entering the hologram element 51 in a state where the objective lens 6 is in the neutral position. The second virtual straight line 57 is drawn in parallel to the first virtual straight line 56 on the hologram element 51, while being spaced at a predetermined distance d from the first virtual straight line 57.

Further, when a size of a reflected light spot which is reflected by the second recording layer 8b and enters the hologram element 51, is smaller than that of a reflected light spot which is reflected by the first recording layer 8a and enters the hologram element 51, the splitting section for tracking 54 is formed in a region excluding the interline region 58 and a moving region 59. In the moving region 59, the reflected light spot which is reflected by the second recording layer 8b and enters the hologram element 51, moves with the displacement of the objective lens 6.

In other words, the hologram pattern 52 of which the outer shape is substantially circular is divided into the splitting section for focus 53 and the splitting section for tracking 54 by a first dividing line 60. The first dividing line 60 is substantially parallel to the radial (X) direction and is positioned to overlap the second virtual straight line 57. The first dividing line 60 has a semi-circular curved line portion 60a formed in the center thereof. The splitting section for focus 53 is formed to have the semi-circular moving region 59. The moving region 59 protrudes toward the splitting section for tracking 54 more than a virtual dividing line 60b (which coincides with the second virtual straight line 57 in the vicinity of the center portion in the hologram element 51). The virtual dividing line 60b connects both ends of the first dividing line 60 in the semi-circular curved line portion 60a of the first dividing line 60. The moving region 59 is centered on the optical axis 55 of the reflected light. The radius of the moving region 59 is set to a length larger than the distance d between the first virtual straight line 56 and the second virtual straight line 57. Further, the moving region 59 is formed in a substantially semi-circular shape protruding toward the splitting section for tracking 54 more than the second virtual straight line 57. The radius can be set by previously testing and obtaining a region where the reflected light spot from the second recording layer 8b moves depending on the displacement of the objective lens 6 in the X direction.

The splitting section for tracking 54 is further divided into two parts by a second dividing line 61 parallel to a tangential (Y) direction through the optical axis 55 of reflected light, so that two splitting section pieces for tracking 62 and 63 are formed. Therefore, two of the splitting section pieces for tracking 62 and 63 are respectively formed in a circular ring shape.

The splitting section for focus 53 and the splitting section pieces for tracking 62 and 63 are respectively referred to as first to third regions 53, 62, and 63 in accordance with the hologram pattern of the hologram element provided in the optical pickup.

The moving region 59 protrudes from the splitting section for focus 53 so as to have a substantially semi-circular shape, and the splitting section for tracking 54 is formed in a portion except for the moving region 59. Then, a reflected light spot having a small size, which is reflected by the second recording layer 8b and enters the hologram element 51, enters the moving region 59 of the first region 53 serving as the splitting region for focus 53 so as to enter the first light receiving section 7A, but does not enter the second and third regions 62 and 63 serving as the splitting section for tracking 54 for obtaining a TES, even though the irradiated position thereof varies depending on the displacement of the objective lens 6. Therefore, the reflected light from the second recording layer 8b can be prevented from having an effect on a TES, which makes it possible to enhance a tracking servo characteristic.

In the splitting section for focus 53 and the splitting section pieces for tracking 62 and 63, a plurality of grooves are formed, respectively. The depth and interval of those grooves are set on the basis of the diffraction efficiency of the hologram pattern 52 and the disposition of the light receiving unit 7.

Figure 3:
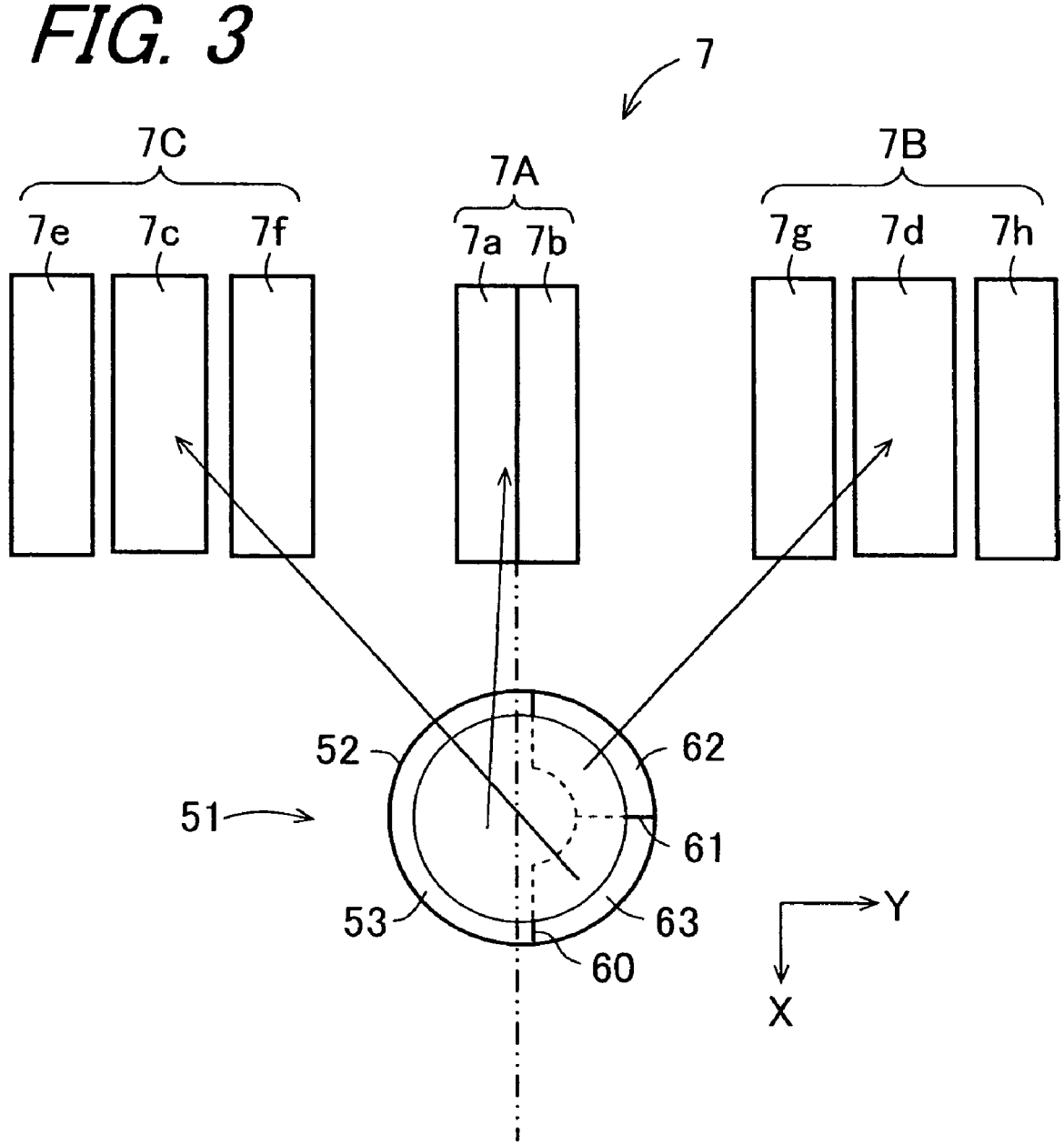
FIG. 3 is a diagram schematically showing that light split by a hologram pattern enters a light receiving section 7.

FIG. 3 is a diagram schematically showing that light split by the hologram 51 enters the light receiving unit 7. The reflected light by the first recording layer 8a of the disk 8 passes through the objective lens 6 and a collimator lens 5 so as to enter the hologram element 51. The reflected light entering the hologram element 51 is split by the first region 53 serving as the splitting section for focus 53 and the second and third regions 62 and 63 serving as the first and second splitting section pieces for tracking 62 and 63 and is then introduced into the light receiving unit 7.

The reflected light diffracted by the first region 53 is introduced into the first light receiving section 7A for detecting an FES and is detected by both or any one of first and second light receiving elements 7a and 7b. The FES is position information on an optical axis direction of a light focusing position by the objective lens 6, and is obtained by a knife-edge method. In the knife-edge method, it is possible to obtain the FES by calculating a difference in light intensity between light components received by the first and second light receiving elements 7a and 7b, respectively. Specifically, when the light intensities detected by the first and second light receiving elements 7a and 7b are represented by attaching 'I' in front of reference numerals, an FES is given by the following expression (1). Further, the detection light intensities of the respective light receiving elements other than the first and second light receiving elements 7a and 7b are represented by attaching 'I' in front of reference numerals.

$$FES=I7a-I7b \quad (1)$$

In the arrangement of the hologram 51 and the light receiving unit 7 of FIG. 3, when light is focused in front (near side) of the disk 8, the reflected light is focused in front of the first receiving unit 7A. Therefore, the intensity (I7b) of light received by the second light receiving section 7b becomes larger than the intensity (I7a) of light received by the first light receiving section 7a, so that FES becomes negative.

Reversely, when light is focused after being reflected by the disk 8 (far side), that is, when a virtual focus is formed in the rear side which is a opposite side to the objective lens 6 with respect to the disk 8, the reflected light is focused in a position (focal point) which is more distant than the first light receiving section 7A. Therefore, the intensity (I7a) of light received by the first light receiving section 7a becomes larger than the intensity (I7b) of light received by the second light receiving section 7b, so that FES becomes positive.

The second light receiving section 7B includes three light receiving elements, i.e., third to fifth light receiving elements 7d, 7g, and 7h. Among the reflected light components passing through the second region 62 of the hologram pattern 52, a reflected light component by the main beam 11 is received by the third light receiving element 7d. Further, reflected light components by the first and second sub-beams 12 and 13 are received by the fifth and fourth light receiving elements 7h and 7g, respectively.

The third light receiving section 7C includes three light receiving elements, i.e., sixth to eighth light receiving elements 7c, 7e, and 7f. Among the reflected light components passing through the third region 63 of the hologram pattern 52, reflected light component by the main beam 11 is received by the sixth light receiving element 7c. Further, reflected light components by the first and second sub-beams 12 and 13 are received by the eighth and seventh light receiving elements 7f and 7e, respectively.

On the basis of the results of light received by the second and third light receiving sections 7B and 7C, track position information is detected by, for example, a differential phase detection (DPD) method. In the DPD method, the track position information is detected by a differential phase between a light intensity I7c and a light intensity I7d. The light intensity I7c is obtained by the sixth light receiving element 7c receiving the reflected light of the main beam 11 in the third light receiving section 7C, and the light intensity I7d is obtained by the third light receiving element 7d receiving the reflected light of the main beam 11 in the second light receiving section 7B. In other words, TES by DPD; I (DPD) is given by the following expression 2. In the expression 2, ph means a value obtained by calculating a differential phase between the respective intensities.

$$I(PDP)=ph(I7c-I7d) \quad (2)$$

A generated differential phase changes depending on which position of an optical beam a pit formed on the disk 8 passes through. When the pit passes through the dead center of the optical beam, the differential phase becomes 0.

The TES showing track position information may be detected by a differential push pull (DPP) method, instead of the DPD method. In the DPP method, a TES is detected by the results of light received by the second and third light receiving sections 7B and 7C.

TES by the DPP method; I (DPP) is given by the following expression (3).

$$I(DPP)=(I7c-I7d)-k\times((I7f-I7h)+(I7e-I7g)) \quad (3)$$

Here, (I7c−I7d) of TES is a push pull signal of the main beam 11, and (I7f−I7h) and (I7e−I7g) are push pull signals of the first and second sub-beams 12 and 13 which are ±first-order lights. The positions of three beams are disposed on the disk track such that the difference between the phase of (I7f−I7h) and (I7e−I7g) and the phase of (I7c−I7d) becomes 180 degrees, in order to cancel an offset caused by the shifting of the objective lens which offset appears in the TES.

In the expression (3), the coefficient k is a constant for correcting a difference in light intensity among the main beam 11 which is zero-order light, the first sub-beam 12 which is +first-order light and the second sub-beams 13 which is −first-order light. When an intensity ratio of zero-order light:+first-order light:−first-order light is a:b:b, the following equation is established: k=a/(2b).

An RF signal I (RF) as a reproduction signal of information is given by the following expression (4).

$$I(RF)=I7c+I7d+I7a+I7b \quad (4)$$

Figure 4:
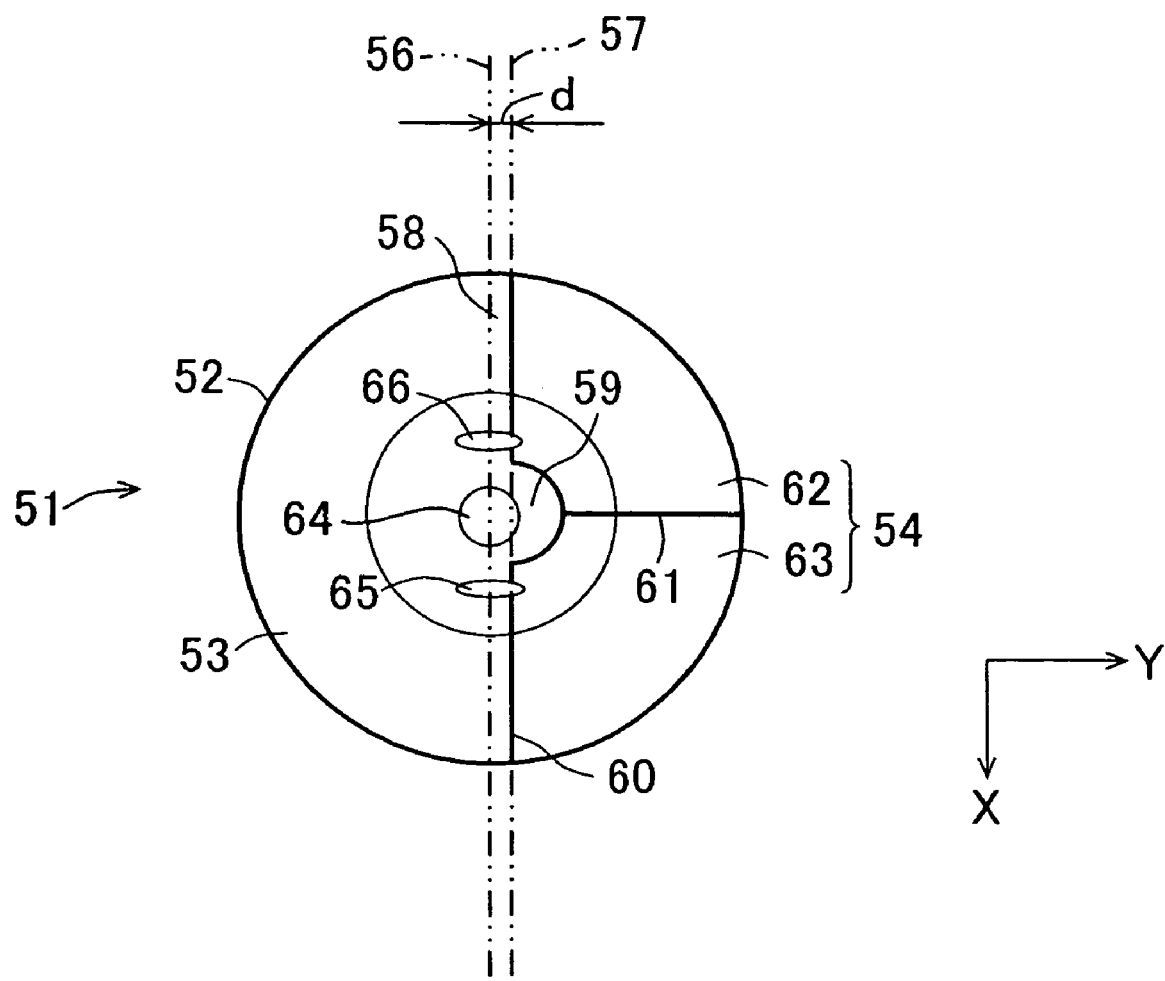
FIG. 4 is a top view showing a state where stray light enters the hologram pattern.

FIG. 4 is a top view showing a state where stray light enters the hologram pattern 52. FIG. 4 represents the relationship between an interval d and stray light as diffracted light by the second recording layer 8b when recording/reproducing of the first recording layer 8a is performed. The interval d is a parallel distance between the first and second virtual straight lines 56 and 57 in the hologram pattern 52.

Here, the interval d is set to such a value that ±first-order diffracted light spots 65 and 66, which are stray light components from the second recording layer 8b, can be included between the first and second virtual straight lines 56 and 57 when recording/reproducing of the first recording layer 8a is performed.

Figure 11:
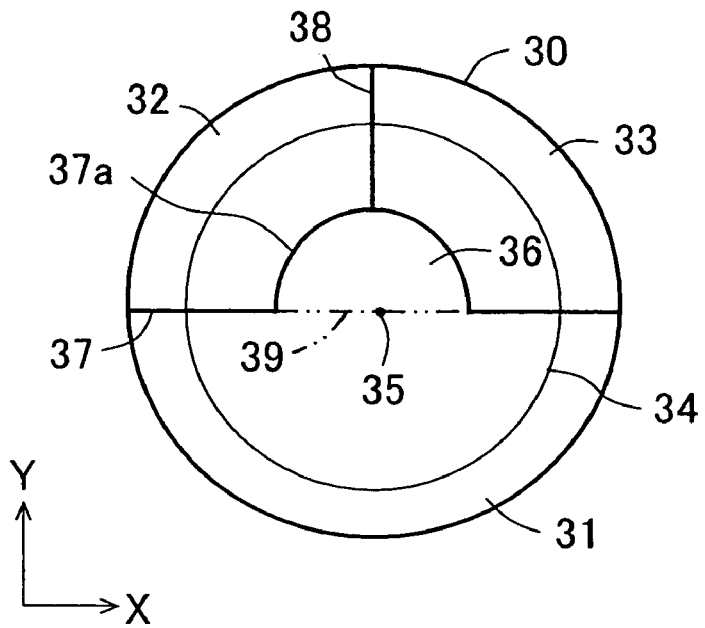
FIG. 11 is a top view showing the configuration of a hologram element proposed in the optical pickup according to the related art.
Figure 12:
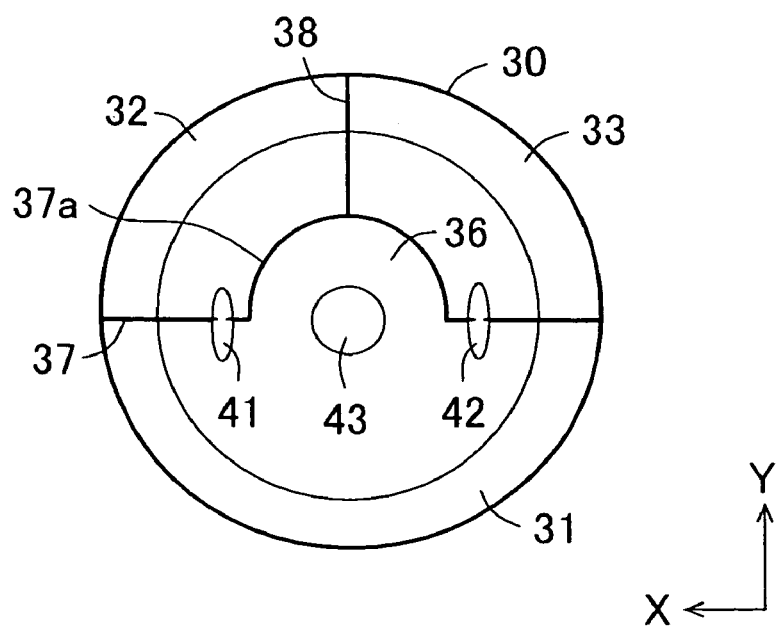
FIG. 12 is a diagram showing a state where diffracted light by a second recording layer enters the hologram element.
Figure 13:
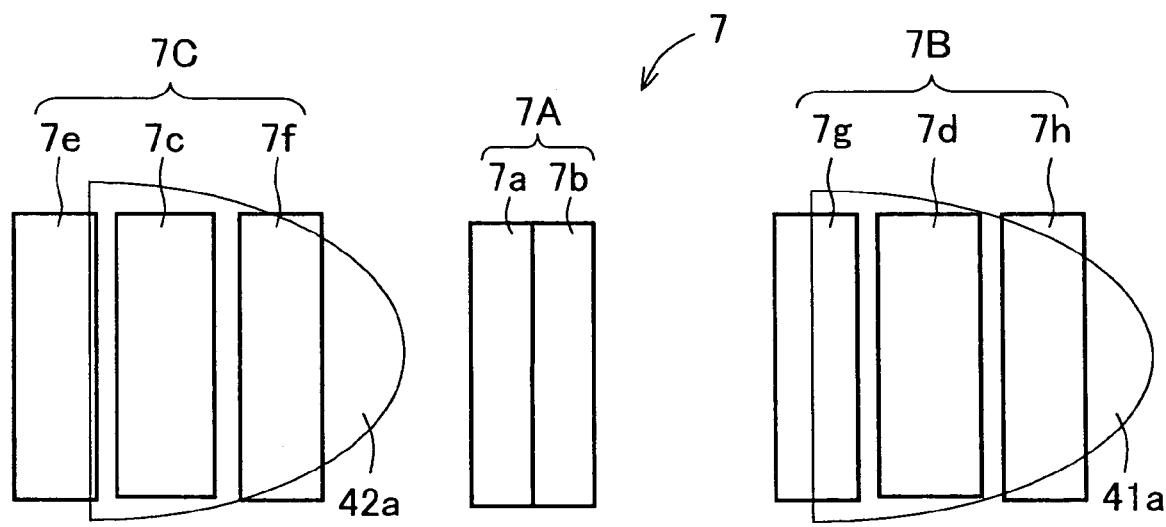
FIG. 13 is a diagram showing a state where diffracted light by the second recording layer enters the light receiving unit unit.

However, when the interval d becomes large, a push pull component of light signal included in the second and third regions 62 and 63 serving as the splitting section for tracking 54 of the hologram pattern 52 are reduced. Therefore, characteristics of TES are degraded. Accordingly, it is preferable that the interval d is set to such a value that the push pull amplitude of light signal entering the splitting section for tracking 54 of the hologram pattern 52 of the present embodiment becomes 70% or more with respect to the push pull amplitude of light signal entering the splitting sections for tracking 32 and 33 of the above-described hologram pattern shown in FIG. 11, in which the interval d is 0. Setting of such an interval d can be implemented by manufacturing hologram patterns having splitting sections for tacking formed by changing an interval d into various values; measuring the push pull amplitudes of light signal entering the splitting sections for tracking in these hologram patterns; and comparing the measured push pull amplitudes with the push pull amplitude of light signal entering the splitting section for tracking of the hologram pattern shown in FIG. 11, in which the interval d is 0, and calculating an amplitude ratio.

Among the stray light components from the second recording layer 8b, the zero-order diffracted light spot 64 enters in a shape close to a focused state in the vicinity of the optical axis 55 where light reflected by the first recording layer 8a enters the hologram pattern 52 in a state where the objective lens 6 is in the neutral position. When an interval between the first and second recording layers 8a and 8b has changes, the diameter of the stray light spot 64 changes. However, the substantially semi-circular moving region 59 centered on the optical axis 55 is formed to have a radius including a spot diameter when the interval is changed by about ±15 μm in comparison with a standard value.

Among the stray light components from the second recording layer 8b, the ±first-order diffracted light spots 65 and 66 enter the first region 53 serving as the splitting section for focus 53, and the first region 53 includes the interline region 58 formed to have the interval d between the first and second virtual straight lines 56 and 57.

By forming the split regions of the hologram pattern 52, when recording/reproducing of the first recording layer 8a is performed, among stray light components from the second recording layer 8b, stray light components entering the splitting section for tracking 54 for generating a TES can be reduced. Therefore, it is possible to perform the stabilized tracking servo.

The hologram element may be constructed so that diffraction efficiency differ depending on a polarization direction of light entering the hologram element. For example, a quarter wavelength plate (λ/4 plate) is disposed between the hologram element and a disk, and a diffraction direction of light emitted from a light source and a diffraction direction of light reflected by the disk are rotated by 90 degrees. Then, it is possible to nearly transmit the hologram element with respect to the emitted light from the light source and to generate diffracted light only with respect to the reflected light from the disk. As such a diffraction characteristic is given to the hologram element, utilization efficiency of light increases. Therefore, high-speed recording on the disk can be performed.

Figure 5:
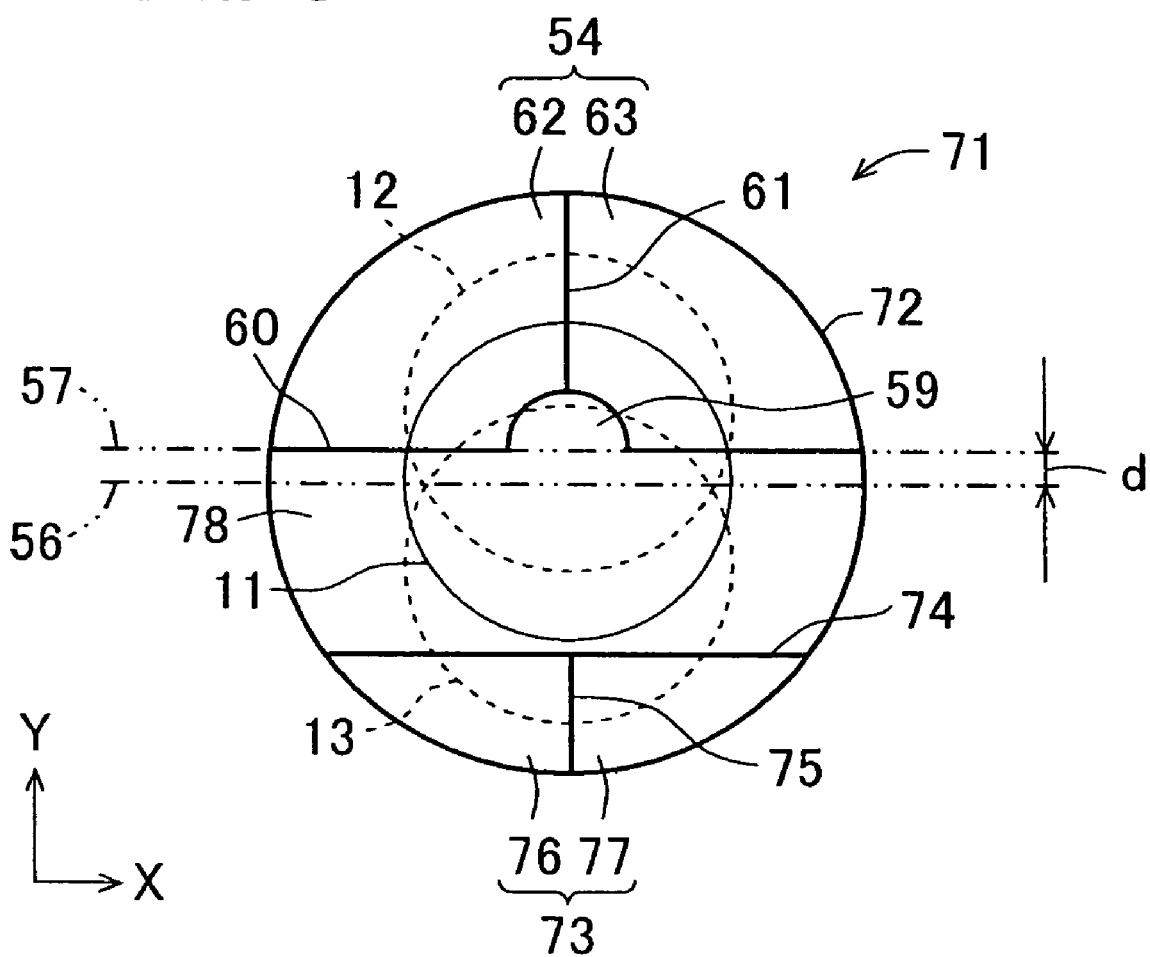
FIG. 5 is a top view showing the simplified configuration of a hologram element provided in an optical pickup according to a second embodiment of the invention.

FIG. 5 is a top view showing the simplified configuration of a hologram element 71 provided in an optical pickup according to a second embodiment of the invention. The optical pickup of the present embodiment has almost the same configuration as the optical pickup 50 of the first embodiment, except for the hologram element 71 which is a feature thereof. Therefore, a drawing showing the entire configuration and the descriptions thereof will be omitted. Further, the hologram element 71 provided in the optical pickup of the present embodiment is similar to the hologram element 51 provided in the optical pickup 50 of the first embodiment. Therefore, the corresponding components will be denoted by the same reference numerals, and the descriptions thereof will be omitted.

In the hologram element 71, splitting sections for tracking of a hologram pattern 72 are formed on an opposite side to the second and third regions 62 and 63 with respect to the first virtual straight line 56, in addition to the second and third regions 62 and 63. Hereinafter, the second and third regions 62 and 63 serving as the splitting section for tracking 54, which are formed the same as in the hologram pattern 52 of the first embodiment, are referred to as a first splitting section for tracking 54 for convenience in the present embodiment. The splitting section for tracking formed on the opposite side to the first splitting section for tracking 54 with respect to the first virtual straight line 56 is referred to as a second splitting section 73 for tracking for convenience.

The second splitting section 73 for tracking is formed as follows. The region corresponding to the first region in the hologram pattern 52 of the first embodiment according to the invention is divided into a bow-shaped region 73 and a first region 78 serving as a splitting section 78 for focus by a third dividing line 74. The third dividing line 74 is parallel to the first virtual straight line 56 and extends in the X direction on the opposite side to the second virtual straight line 57 with respect to the first virtual straight line 56. The bow-shaped region 73 is the second splitting section for tracking 73.

In the second splitting section for tracking 73, the bow-shaped region is evenly divided into fourth and fifth regions 76 and 77 by a fourth dividing line 75 parallel to the Y direction. While recording/reproducing of the first recording layer 8a is being performed, light that is reflected by the first recording layer 8a and then enters the fourth region 76 is diffracted by the fourth region 76 so as to enter the second receiving section 7B, and light entering the fifth region 77 is diffracted by the fifth region 77 so as to enter the third light receiving section 7C.

The disk is irradiated with the main beam 11 and the first and second sub-beams 12 and 13 in such an arrangement that three beam spots line up in the Y direction which is the tangential direction with respect to the track formed in the recording layer of the disk 8. Therefore, the reflected light spots by the disk 8 also enters the hologram pattern 72 in a state of being arranged on the hologram pattern 72 in the Y direction.

Therefore, one sub-beam (the second sub-beam 13 in the present embodiment) of two sub-beams is deviated from the first splitting section for tracking 54 toward the first region 78 serving as the splitting section for focus so as to enter the hologram pattern 72. In this case, the light intensity of the second sub-beam 13 entering the first splitting section for tracking 54 becomes small. Therefore, the second sub-beam 13 alone which is diffracted by the first splitting section for tracking 54 and then enters the second and third light receiving sections 7B and 7C, leads to the reduction in quality of TES, and lens shifting characteristics are degraded.

In the hologram pattern 72 of the hologram element 71 of the present embodiment, however, the second splitting section for tracking 73 is formed so that a part of the second sub-beam 13 enters a side where the incident position of the second sub-beam 13 is deviated, that is, the opposite side to the first splitting section for tracking 54 with respect to the first virtual straight line 56. Accordingly, the light diffracted by the fourth and fifth regions 76 and 77 serving as the second splitting section for tracking 73 is received as a TES detection signal by the second and third light receiving sections 7B and 7C. In addition, the light diffracted by the first splitting section for tracking 54 is received as a TES detection signal by the second and third light receiving sections 7B and 7C. Therefore, an objective lens shifting signal is hardly affected by noise, which makes it possible to improve TES characteristics. Moreover, the third dividing line 74 forming the boundary between the first region 78 and the fourth and fifth regions 76 and 77 may be in a curved line.

In the present embodiment, the recording layer formed in the recording medium is formed of two layers. However, the invention is not limited thereto, and the number of recording layers may be more than or equal to three.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical pickup which records information on a recording medium and/or reproduces information from a recording medium by irradiating the recording medium with light which recording medium has a plurality of recording layers for recording information, the optical pickup comprising:

a light source for emitting light;

an objective lens for focusing the light emitted from the light source on one recording layer of the recording medium, the objective lens being disposed so as to be displaceable in a direction perpendicular to an optical axis of the emitted light within a movable range including a neutral position where the optical axis of the objective lens and the optical axis of the emitted light from the light source are on the same axis, and to change a focused position of the emitted light with respect to the recording medium by displacement in the direction perpendicular to the optical axis of the emitted light;

a light receiving unit having a plurality of light receiving elements for receiving light reflected by the recording medium; and a light splitting unit that is provided between the light receiving unit and the objective lens and has a plurality of splitting sections for splitting the reflected light from the recording medium into a plurality of light components, the light splitting unit having a splitting section for tracking which splits light used for obtaining track position information as information on a focused position of emitted light with respect to the recording medium in a direction perpendicular to the optical axis of the emitted light, wherein the splitting section for tracking is formed in a region excluding a region interposed between a first virtual straight line and a second virtual straight line, in which the first virtual straight line is drawn on the light splitting unit in parallel to a radial direction of the recording medium, and passes through the optical axis of reflected light entering the light splitting unit in a state where the objective lens is in the neutral position, and the second virtual straight line is drawn on the light splitting unit in parallel to the first virtual straight line, while being spaced at a predetermined distance from the first virtual straight line.

2. The optical pickup of claim 1, wherein when a size of a reflected light spot which is reflected by a recording layer other than one recording layer and enters the light splitting unit is smaller than that of a reflected light spot which is reflected by the one recording layer and enters the light splitting unit, the region interposed between the first virtual straight line and the second virtual straight line is formed to include a diffracted light spot generated by the recording layer other than the one recording layer.

3. The optical pickup of claim 1, wherein when a size of a reflected light spot which is reflected -by a -recording layer other than one recording layer and enters the light splitting unit is smaller than that of a reflected light spot which is reflected by the one recording layer and enters the light splitting unit, the splitting section for tracking is formed in a region excluding a region interposed between the first virtual straight line and the second virtual straight line and a moving region in which the reflected light spot which is reflected by the recording layer other than the one recording layer and enters the light splitting unit, moves with the displacement of the objective lens.

4. The optical pickup of claim 1, wherein the splitting section for tracking is formed on both sides of the first virtual straight line.

5. The optical pickup of claim 1, wherein the light splitting unit has different diffraction efficiency depending on a polarization direction of incident light.

* * * * *